United States Patent [19]
Bachner

[11] Patent Number: 6,066,081
[45] Date of Patent: *May 23, 2000

[54] METHOD AND APPARATUS FOR ATTACHING A FITMENT TO AND STERILIZING A CONTAINER

[75] Inventor: Jerry G. Bachner, Algonquin, Ill.

[73] Assignee: Nimco Corporation, Crystal Lake, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/552,683

[22] Filed: Nov. 3, 1995

[51] Int. Cl.$^7$ ........................................................ B31B 1/90
[52] U.S. Cl. .............................. 493/102; 493/87; 493/103
[58] Field of Search ................................ 493/84, 87, 102, 493/103, 105, 106, 107, 108, 109, 115

[56] References Cited

U.S. PATENT DOCUMENTS

| | | | |
|---|---|---|---|
| 3,416,412 | 12/1968 | Wilcox | 493/109 |
| 3,566,575 | 3/1971 | Lisiecki . | |
| 3,566,762 | 3/1971 | Vadas et al. | 93/44.1 |
| 3,619,979 | 11/1971 | Martensson et al. | 53/186 |
| 4,198,901 | 4/1980 | Knudsen | 493/103 X |
| 4,590,740 | 5/1986 | Rodocker | 53/426 |
| 4,683,701 | 8/1987 | Rangwala et al. . | |
| 4,742,667 | 5/1988 | Muller et al. | 53/167 |
| 4,788,811 | 12/1988 | Kawajiri et al. | 53/426 |
| 5,267,934 | 12/1993 | Pape et al. . | |
| 5,484,374 | 1/1996 | Bachner et al. | 493/87 |

FOREIGN PATENT DOCUMENTS

WO 93/13880  7/1993  WIPO .

OTHER PUBLICATIONS

"The Use of Ultraviolet Technology For Surface Disinfection," published by Aquionics Incorporated of Erlanger, Kentucky.

"Rotary Cap & Parts Feeders," published by Feed Systems Inc. of Riverhead, New York.

*Primary Examiner*—David A. Scherbel
*Attorney, Agent, or Firm*—Jenner & Block

[57] ABSTRACT

A method and apparatus for attaching a fitment to a container and for disinfecting the container prior to sealing either end of the container. The fitment is attached to the container in a novel apparatus and then the container is fed into an existing form, fill and seal machine. The apparatus also disinfects the containers while their top and bottom flaps are open to achieve better results than existing disinfecting techniques. A method of attaching a spout to a container and a method of sterilizing a container also are disclosed.

5 Claims, 12 Drawing Sheets

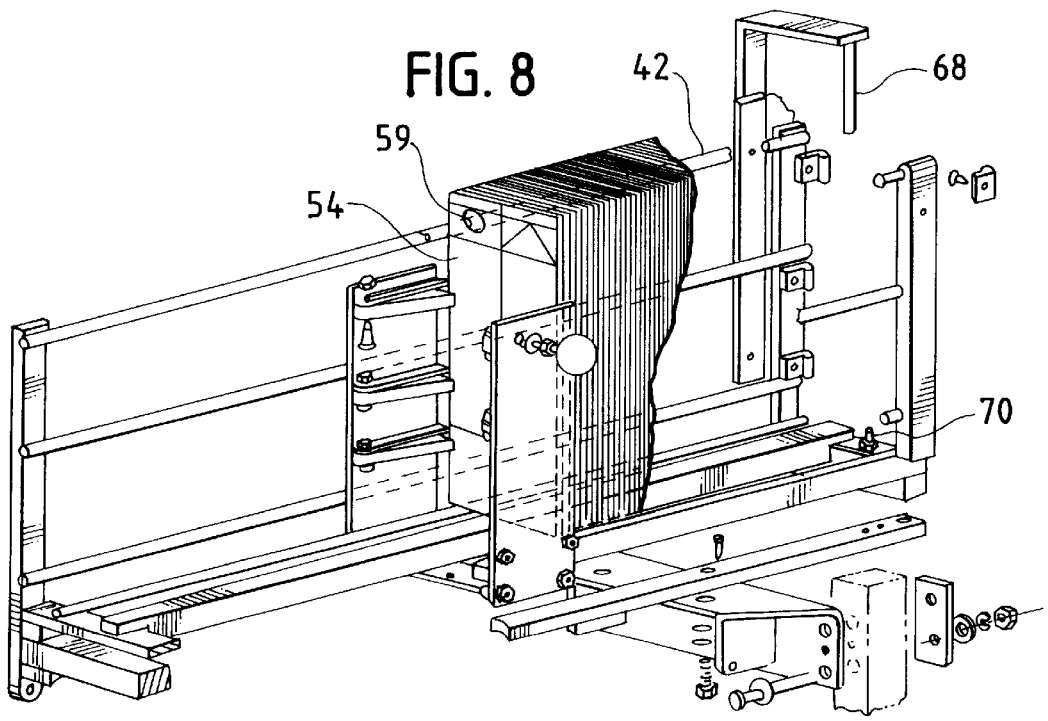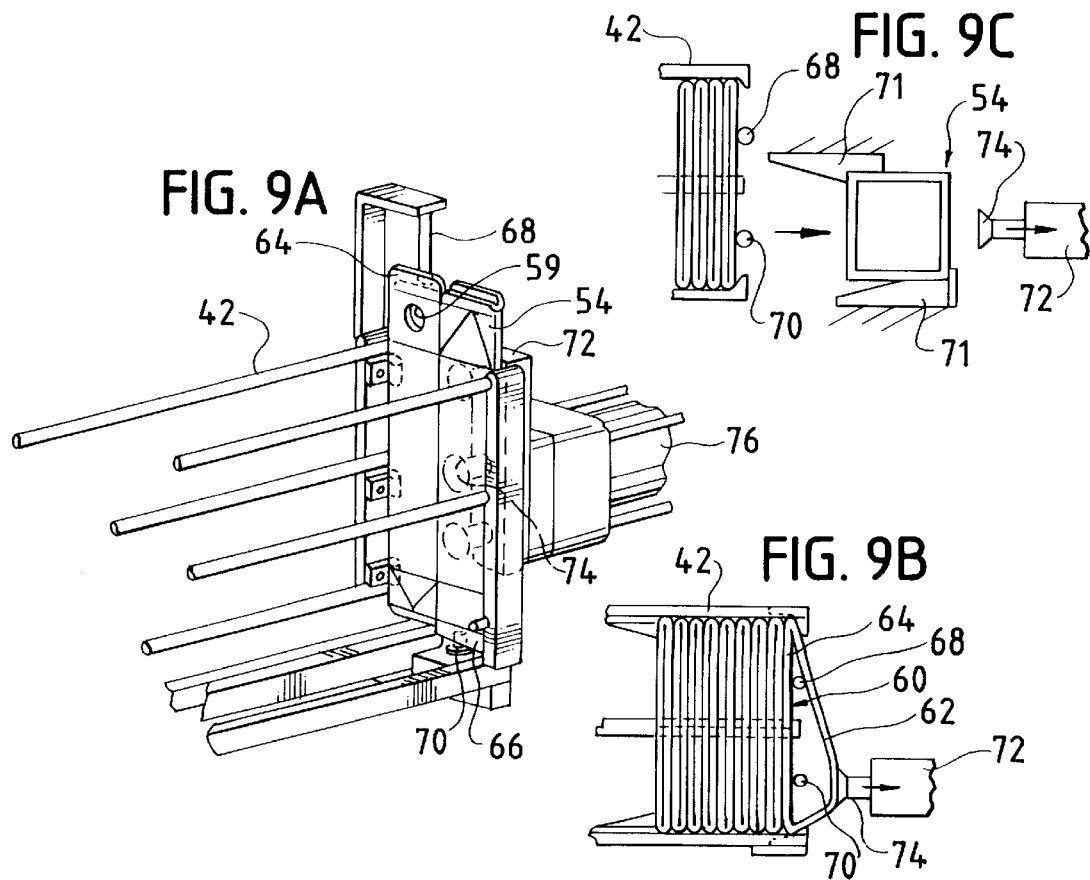

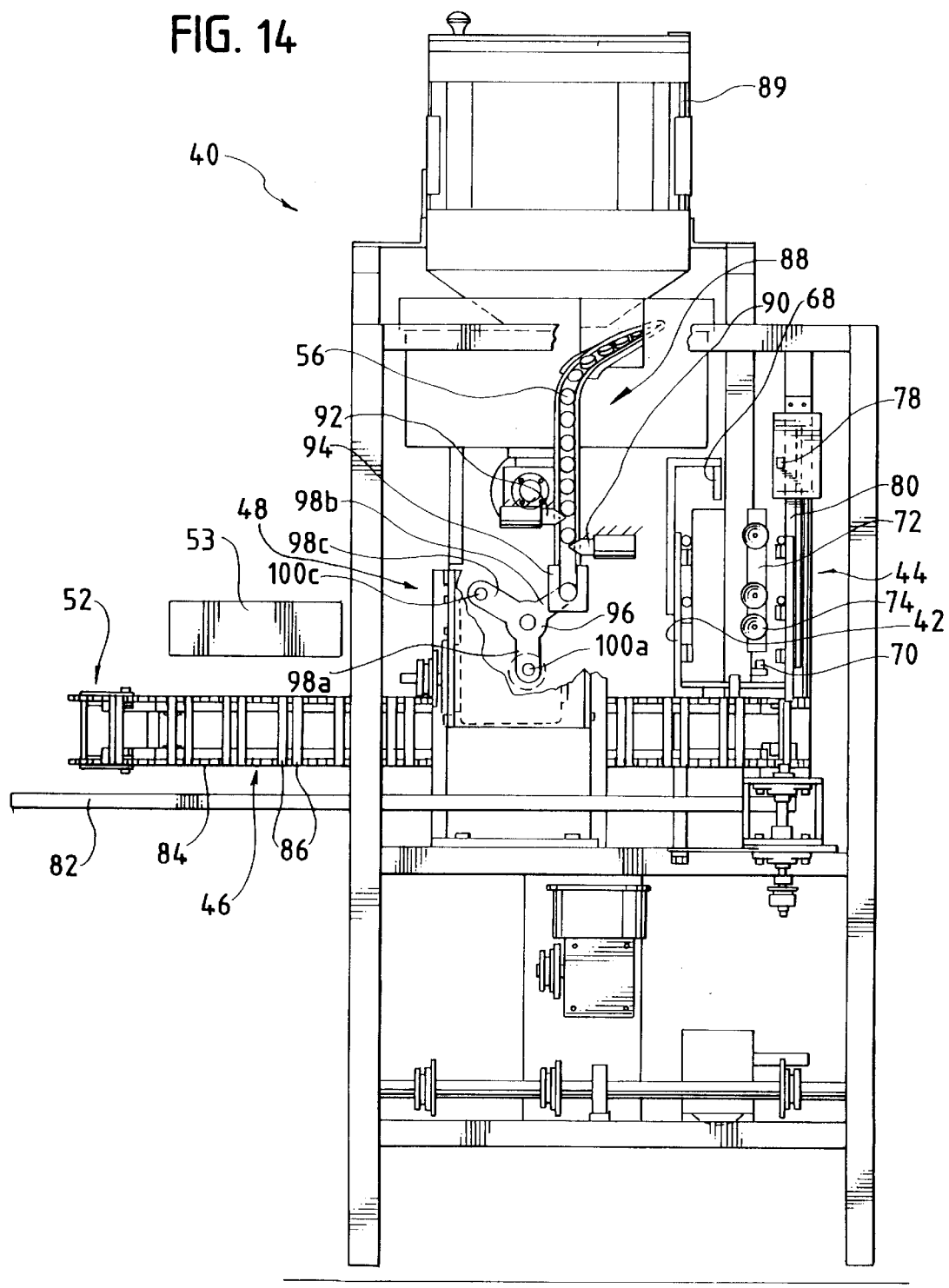

METHOD AND APPARATUS FOR ATTACHING A FITMENT TO AND STERILIZING A CONTAINER

BACKGROUND OF THE INVENTION

1. Field of the Invention

The present invention relates to machines for manufacturing containers, and more particularly, to a machine that attaches fitments, resealable or otherwise, to containers such as paperboard containers and sterilizes the container while both ends of the container are open prior to further forming, filling and sealing of the container.

2. Description of the Related Art

Manufacturers are increasingly using paperboard containers as alternative packaging to cans, bottles and other receptacles for food, beverage and non-food products. Typically, paperboard containers are coated with a heat-sealable substrate and are formed, filled and sealed using a machine such as the prior art machine 10 depicted in FIG. 1. As illustrated therein, flat blank containers 12 stored in a magazine 14 are opened, squared and placed onto forming mandrels 17 in a bottom sealing station 16. Thereafter, the bottom end of the container is preformed, heated and pressure sealed. Other package-forming steps such as preforming the top end also may be undertaken as the bottom end is sealed.

Containers 12 are then discharged from station 16 and placed on a conveyor 18 for transport to a conventional filling station 20 where containers 12 are filled with product. Thereafter, containers 12 pass through a conventional top sealing station 22 where the top flaps are heated, closed and pressure sealed.

The operation of machines 10 is schematically depicted in FIG. 2. Flat, blank containers 12 are stored in a magazine at step $S_1$. Subsequently, they are removed from the magazine and opened and squared at step $S_2$. Thereafter, the bottom flaps of container 12 are preformed at step $S_3$ and heated at step $S_4$. The bottom flaps are then sealed (and the top flaps are preformed) at step $S_5$. At step $S_6$, the container 12 is outfeeded to the conveyor. Next, container 12 is filled with product at step $S_7$, transported to step $S_8$ where the top flaps are heated, and then to step $S_9$ where the top flaps are sealed. At step $S_{10}$, a date code can be stamped on container 12, if desired.

Consumers usually open conventional gable-top paperboard containers by splitting apart one side of the gable-top seal and pulling out the gussets from the center of the split seal to expose the container's built-in pour spout. Once opened, the gable-top container cannot be resealed effectively. As a result, the contents of the container can leak or spill if, e.g., the container is stored on its side or is unintentionally knocked over or shaken. In addition, product stored in an opened gable-top container 12 is more susceptible to spoilage or contamination. In addition, some gable-top seals are very difficult to open because of the substrates utilized, thereby necessitating access to the product without opening the gable-top seal. To overcome these problems, pouring spouts with reclosable caps and other fitments (e.g., plastic patches which may be punctured for access to the product) have been added to paperboard containers.

FIG. 3 shows a prior art form, fill and seal machine 24 with an applicator station for attaching capped spouts to paperboard containers. Details of the workings of prior art machines with capped spout applicators such as machine 24 are available in U.S. patent application Ser. No. 07/783,038, filed on Oct. 25, 1991 and entitled "Method and Apparatus For Attaching a Spout to a Container," the contents of which are hereby incorporated by reference. As depicted in FIG. 3, flat, blank containers 26 previously loaded in a magazine 28 are individually withdrawn, opened, squared and placed onto forming mandrels. Subsequently, the bottom flaps of the container 26 are heated, formed and pressure sealed in a conventional manner within a forming station 30. After its bottom end is sealed, container 26 is outfed to a conveyor 32 and transferred to a location adjacent a spout application station 34. There, a capped spout 36 is inserted through a preformed hole in container 26 and attached to the inner wall of container 26. Alternative methods are available for attaching the spout to the outer wall of the container, too. Container 26 then continues travelling on conveyor 32 to a conventional filling station 38 where it is filled with product. Thereafter, the container 26 is transported through a gable-top sealing station 39. There, its top flaps are heated, closed and pressure sealed.

The packaging of food and beverage products poses certain contamination risks. In addition, food and beverage producers are constantly working to extend shelf-life of perishable products. These two concerns often necessitate sterilization or cleansing of the container prior to its being filled with product. In existing machines, containers typically are sanitized after the bottom flaps of the container have been folded and sealed, and just prior to filling the container with product. Cleansing techniques include the use of ultraviolet ("UV") light, chemical solutions (e.g., hydrogen peroxide), steam, or a combination of two or more of these techniques.

Existing cleansing techniques have an inherent drawback in that cleansing occurs after one end (usually the bottom end) of the container has been folded and sealed. For example, while UV light can effectively disinfect surface contaminants such as bacteria, yeast, mold and spores, it is only effective on contaminants that are exposed to and penetrated by the UV light. Therefore, UV light may not effectively disinfect certain portions of a partially formed container, e.g., folded edges and corners. Thus, a technique for more effectively sterilizing paperboard containers is desirable.

Chemical and steam cleansing techniques have similar drawbacks. The chemical or steam wash occurs after one end of the container (again, usually the bottom end) is folded and sealed. Therefore, it is possible for contaminants or chemical residue to become trapped in the container. Chemical and steam cleansing treatments also require an additional drying station for the container prior to the fill station.

Chemical and steam cleansing are problematic for additional reasons. Over time, chemical fumes and steam may cause electronic components operating within existing machines to malfunction. Also, in existing machines, cleansing occurs immediately prior to, and adjacent, the filling of the container. As a result, chemicals, which may be detrimental to the product, are immediately adjacent the fill area. This placement introduces the risk of the chemicals being introduced into the fill area via, e.g., splashing or lingering residue on the container.

In addition, industrial safety hazards created by the use of chemicals, as well as governmental regulations relating to effluent discharge are causing manufacturers to consider alternative cleansing techniques.

In addition to the aforementioned problems, paper fiber and other particles from manufacturing the blank container may reside on the inner wall of the flat container. Because existing sanitation techniques occur after the bottom end of the container has been sealed, a likelihood exists that such particles will remain in the container after cleansing has occurred. And, if these particles become lodged in an edge or corner of the bottom of the container, common cleansing techniques may not completely disinfect such particles.

Adding stations (such as fitment applicator and cleansing stations) to a packaging machine also can lead to production inefficiencies. The length of machines with fitment applicators and cleansing stations can be a problem for users of existing packaging machines who have limited floor space, especially if the user is operating several packaging machines. Although some existing machines do have excess space for either an applicator or a cleansing station, few can accommodate both without further lengthening of the machine. In addition, statistical analysis reveals that each station in a packaging machine will malfunction a certain percentage of the time. Therefore, the more stations contained within a single machine, the higher the probability for a defective output. For example, if a container is inserted into the magazine backwards, the machine will not be able to properly attach the spout. Nevertheless, the backward container will still pass through a number of stations even though there is no chance of a successful product output. However, if the tasks of a single machine are divided among two or more machines, an error or malfunction at one station is not propagated to all of the subsequent stations. A problem container can be removed in an early stage of production. Thus, stations on the next machine have a higher probability of receiving proper containers as input. By dividing the stations among multiple machines, higher efficiencies and lower errors are achieved.

While spout applicator and sanitation stations incorporated into form, fill and seal machines are desirable to users of packaging machines, prior to the present invention, many machines could not accommodate these additional features. Thus, many users must purchase new form, fill and seal machines to obtain these additional capabilities. However, such machinery can be expensive. In addition, some users are reluctant to switch to machines with these additional features because they have not yet recovered the capital investment made for their currently owned form, fill and seal machines.

At least one prior art machine attaches a spout to an open-ended container as disclosed in U.S. Pat. No. 4,788, 811. However, the spout is first introduced into the preformed opening in the container and later attached to the container. This two-step process may result in the occasional occurrence of defectively attached spouts due to disengagement of a spout from the hole prior to its attachment to the container. In addition, the horizontal positioning of the container prior to sealing one of its open ends subjects the container to the same cleansing problems as described above.

Therefore, a need exists for a novel apparatus that can be used in conjunction with existing form, fill and seal machines to achieve fitment capability and enhanced sanitation. Such a machine ideally would require minimal modification to an existing form, fill and seal machine such as machine 10.

SUMMARY OF THE INVENTION

The above-mentioned problems are reduced or eliminated by a novel apparatus for attaching a fitment such as a spout to a container. The spout is attached to a vertically positioned, open-ended container prior to introducing the container to a form, fill and seal machine. The apparatus includes a magazine or some other device for maintaining an array of flat containers having preformed holes. At a first station, the apparatus sequentially withdraws a container from the magazine and opens and squares the container so that its top and bottom ends are open. The apparatus also includes a conveyor for receiving the container from the first station and for sequentially moving the container in a vertical position from the first station through the apparatus to the form, fill and seal machine. Finally, the apparatus includes a fitment applicator adjacent the conveyor means for inserting the spout into a preformed hole in the container and for simultaneously attaching the fitment spout to the container prior to advancing the container to the form, fill and seal machine.

In one embodiment of the invention, the apparatus also includes means for disinfecting the interior of the container after the fitment has been secured to the container.

In another embodiment of the invention, the apparatus is used to disinfect a container prior to introducing the container to a form, fill and seal machine. This embodiment of the invention can be used for containers with or without fitments. In this embodiment, the apparatus includes a magazine or other device for maintaining an array of flat containers and a first station for sequentially withdrawing a container from the magazine and squaring the container to open up its top and bottom ends. The conveyor receives the vertically positioned container from the first station and sequentially moves the container through the apparatus and introduces the container to the form, fill and seal machine. The container is continuously maintained in a vertical position. The apparatus includes means for disinfecting the inner wall of the open-ended container prior to the introduction of the container to the form, fill and seal machine.

A process in accordance with the present invention is used for forming, filling and sealing a flat container having a preformed hole therein. The container is first squared to open up its top and bottom ends. A spout or other fitment is inserted into the preformed hole and attached to the container. The interior of the container, including the portion of the spout or fitment located inside the container, is disinfected. The bottom end of the container is then closed and sealed. The container is filled with product and the top end of the container is closed and sealed. Throughout this process, the container is maintained in a vertical position.

Another embodiment of a process in accordance with the present invention is used for forming, filling and sealing a flat container. The container is squared to open up its top and bottom ends. The inner wall of the container is disinfected and then the bottom end of the container is closed and sealed. The container is subsequently filled with product and the top end of the container is closed and sealed. Again, the container is continuously maintained in a vertical position.

BRIEF DESCRIPTION OF THE DRAWINGS

FIG. 8 is a perspective view of a magazine that forms a part of an apparatus in accordance with the present invention;

FIG. 9A is a perspective view of a container being withdrawn from the magazine of FIG. 8 by a vacuum head in accordance with the present invention;

FIG. 9B is a top plan view of the vacuum head withdrawing the container at a time after that shown in FIG. 9A;

FIG. 9C is a top plan view of the container within a pair of cage guides at a time after that shown in FIG. 9B;

FIG. 14 is a front elevational view of another alternative embodiment using a steam disinfecting unit.

DETAILED DESCRIPTION OF THE PREFERRED EMBODIMENT

Figure 4:
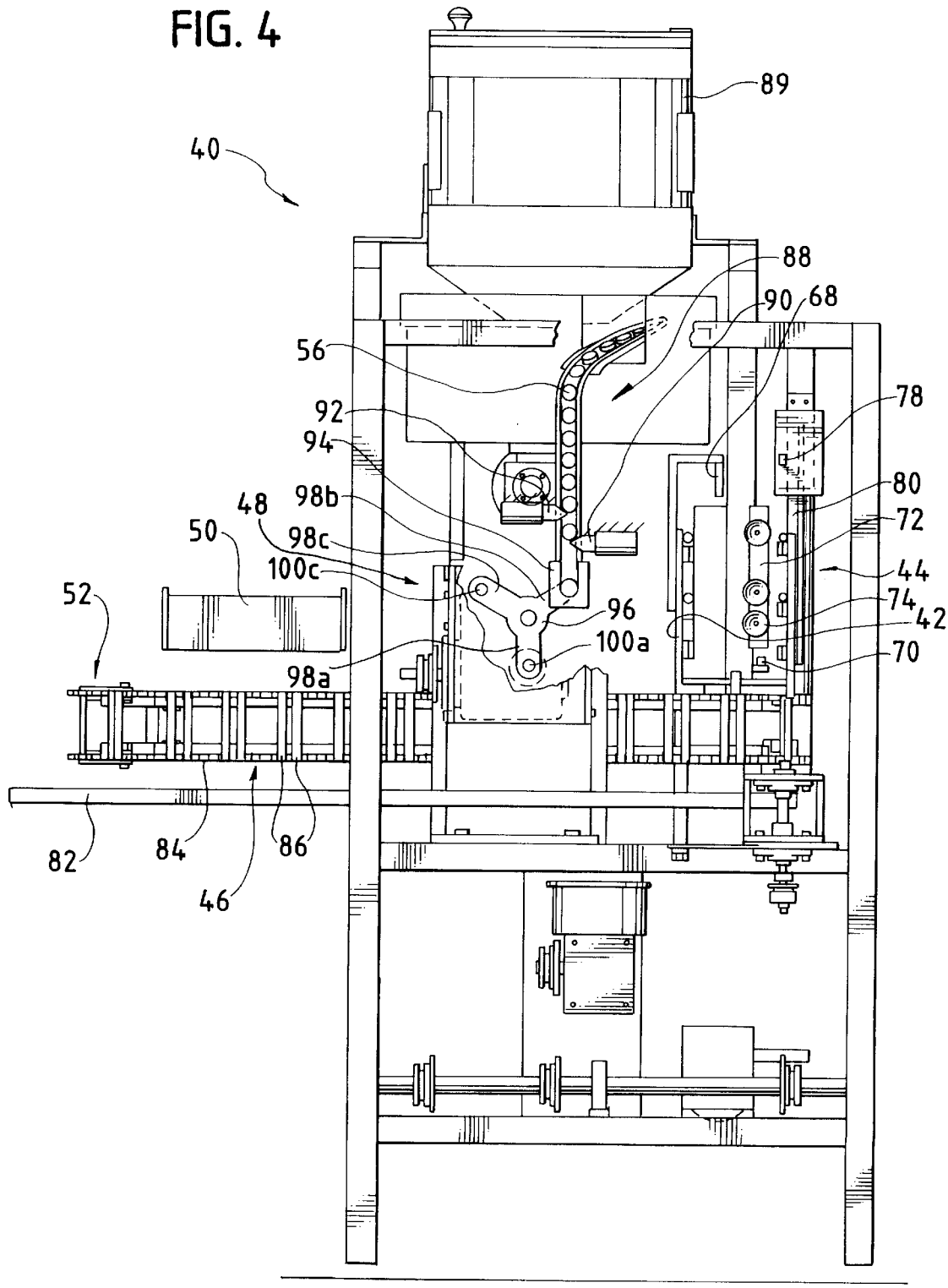
FIG. 4 is a front elevational view of an apparatus in accordance with the present invention.

Referring to FIG. 4, there is shown a pre-applicator machine 40. Machine 40 generally comprises a magazine 42, a squaring station 44, a conveyor 46, a spout applicator station 48, an ultraviolet sanitary unit 50 and an outfeed station 52.

Figure 1:
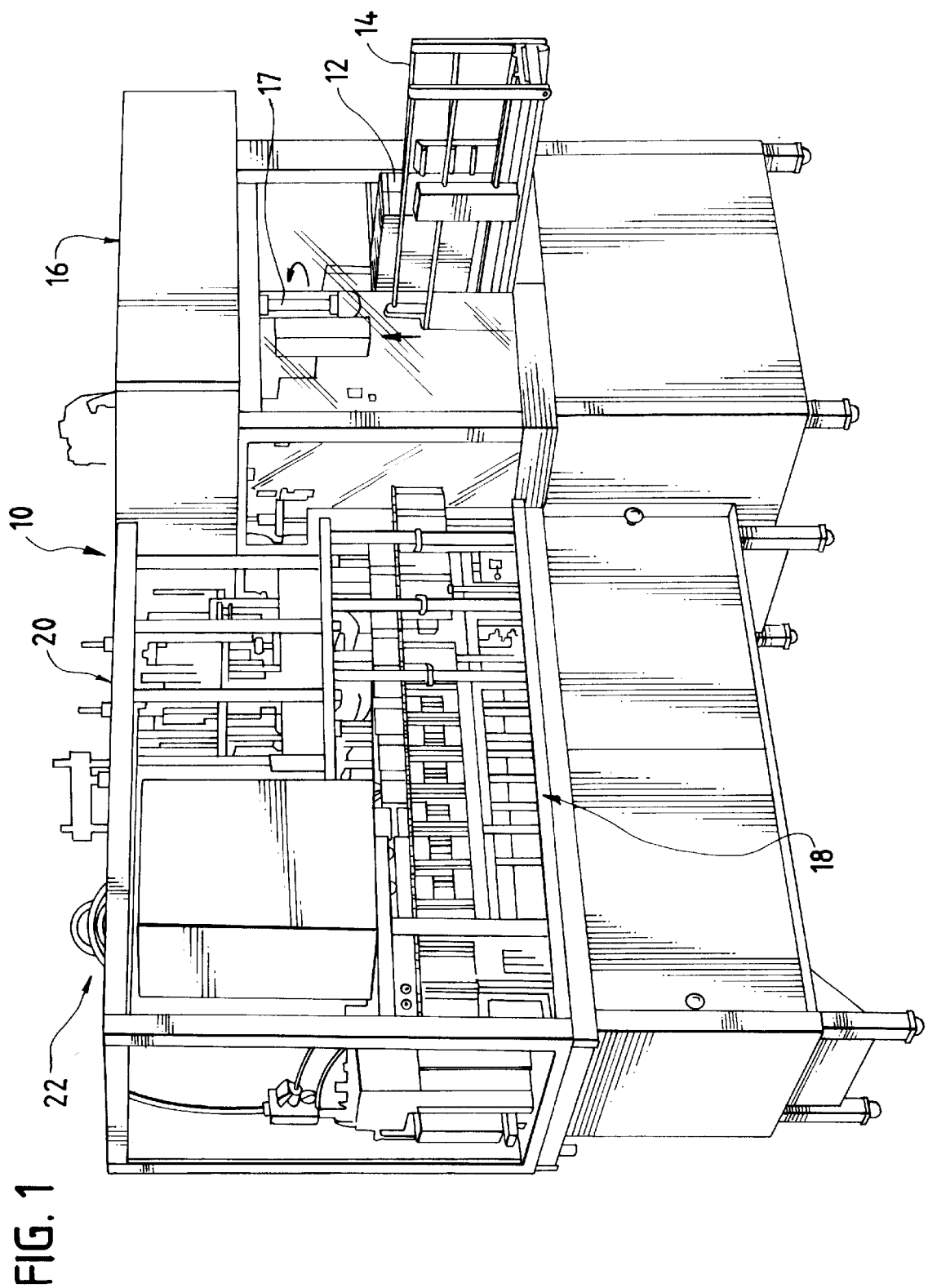
FIG. 1 is a perspective view of a prior art form, fill and seal machine.
Figure 2:
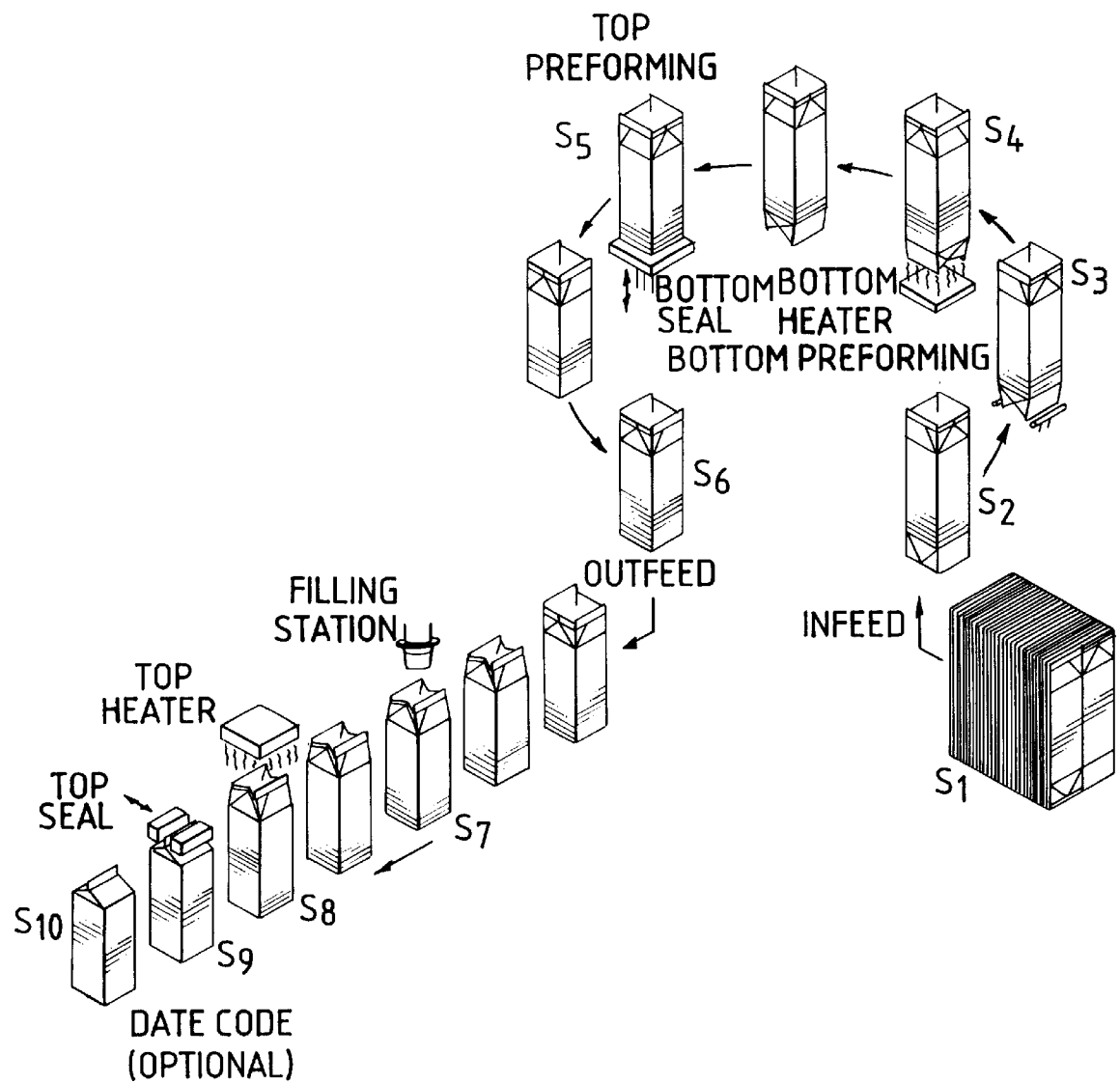
FIG. 2 is a schematic drawing showing the steps performed by the prior art machine of FIG. 1 in forming, filling and sealing a spoutless carton.
Figure 3:
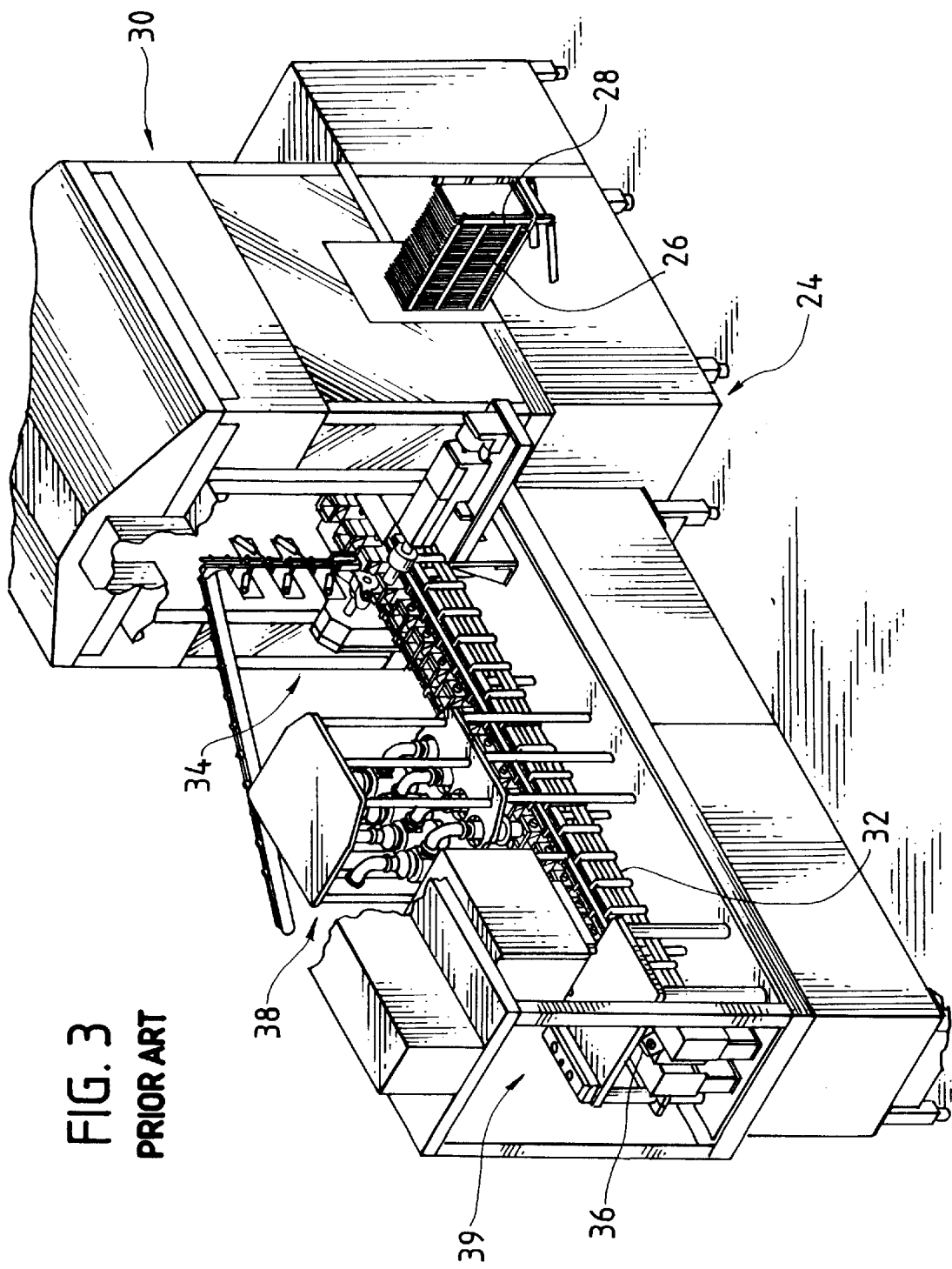
FIG. 3 is a perspective view of another prior art form, fill and seal machine that includes a spout applicator.
Figure 5:
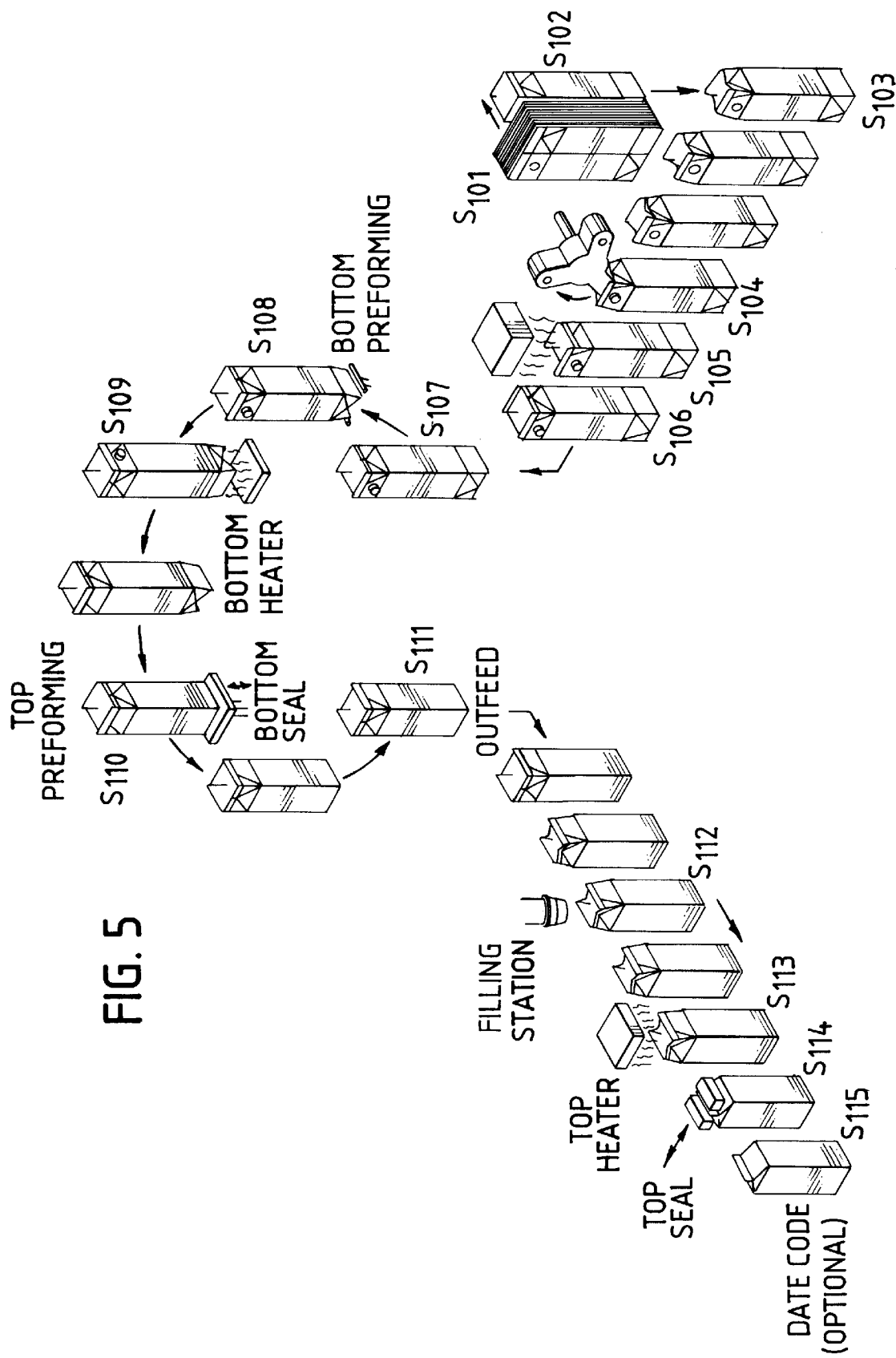
FIG. 5 is a schematic drawing depicting the steps performed by the apparatus of FIG. 4 in conjunction with the machine of FIG. 1 in forming, filling and sealing a carton having a spout.

FIG. 5 depicts schematically the process carried out by a combination of machine 40 and a conventional form, fill and seal machine, such as machine 10. Containers 54 are loaded into magazine 42 at step $S_{101}$. A single container 54 is withdrawn from magazine 42 and "squared" at step $S_{102}$. "Squaring" means opening the top and bottom ends of container 54 and placing the remainder of container 54 in its square cross-sectional configuration. Squared container 54 is guided vertically to conveyor 46 and then travels along conveyor 46 through steps $S_{103}$ to $S_{106}$. Conveyor 46 does not move constantly, but rather in carefully timed, intermittent increments. Conveyor 46 can be driven by any standard drive mechanism for such incremental movement. At step $S_{104}$, container 54 passes through applicator station 48 where a spout 56 is attached to container 54. Container 54 then passes under UV sterilization unit 50 at step $S_{105}$. At step $S_{106}$, container 54 passes through outfeed station 52. At this point, container 54 can be fed into a conventional form, fill and seal machine such as machine 10 of FIG. 1. Thereafter, container 54 is passed through steps $S_{107}$ through $S_{115}$ in substantially identical manner to that previously described with respect to FIG. 2.

Figure 6:
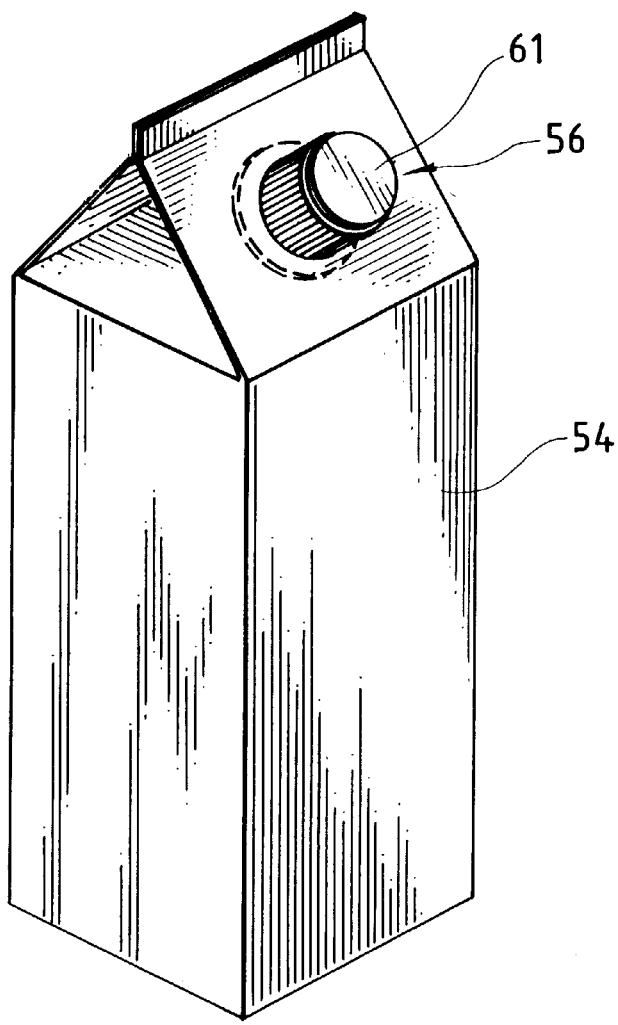
FIG. 6 is a perspective view of a filled carton having a spout.
Figure 7:
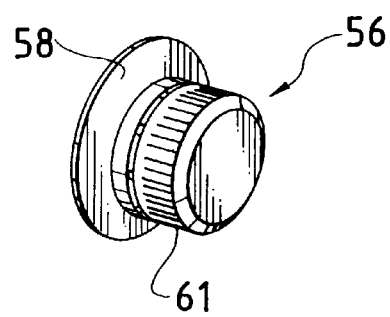
FIG. 7 is a perspective view of a spout with a resealable cap.

The output at step $S_{115}$ is a fully formed, filled and sealed container 54 as depicted in FIG. 6. Container 54 includes a spout 56 with a resealable cap 61. Spout 56 also includes an annular flange portion 58 as shown in FIG. 7. In the preferred embodiment, flange 58 is ultrasonically welded to the inside wall of the top portion of container 54 as more fully described below. Of course, other known methods for attaching the flange, as well as other fitments, to the inside or outside wall of the container may be substituted.

Referring more specifically to FIG. 8, magazine 42 maintains an array of flat, blank containers 54. Each container 54 includes a preformed hole 59 for receiving a spout 56. As seen most clearly in FIG. 9B, in its flat configuration, container 54 includes a back panel 60 and a front panel 62. Back panel 60 comprises two of the four sides of squared container 54. Front panel 62 comprises the remaining two sides of squared container 54. Back panel 60 includes an upper tab 64 that extends above the adjacent portion of front panel 62 and a lower tab 66 that extends below the adjacent portion of front panel 62. Magazine 42 includes a rod 68 and a button 70. Upper tab 64 is restrained by rod 68 and lower tab 66 is restrained by button 70 when container 54 is in the front of the array of containers 54 stored in magazine 42.

Referring to FIGS. 9A–9C, squaring station 44 includes a vacuum head 72 and three vertically positioned suction cups 74 mounted on vacuum head 72. Each suction cup 74 has an air passageway therethrough connected to a vacuum source. Vacuum head 72 is attached to a movable shaft 76 such that vacuum head 72 is movable horizontally toward and away from magazine 42.

As vacuum head 72 moves toward magazine 42, suction cups 74 engage the container 54 located at the front of the array. Air is withdrawn by the suction cups 74 through the air passageways to create a vacuum between the container 54 and suction cups 74. Vacuum head 72 then returns to its original position, and suction cups 74 pull front panel 62 away from magazine 42. As shown in FIG. 9B, rod 68 and button 70 temporarily inhibit back panel 60 from immediately following front panel 62. As a result, container 54 begins to open. As vacuum head 72 continues to retreat to its original position, the resistance provided by rod 68 and button 70 is overcome, and container 54 releases from magazine 42. Vacuum head 72 pulls container 54 into a pair of vertically positioned, cage guides 71 which square up and secure the container in a position such that its top and bottom ends are vertically aligned. The vacuum created by the suction cups 74 is timed to terminate as container 54 becomes confined by cage guides 71. As a result, suction cups 74 disengage container 54 and vacuum head 72 continues to move horizontally back to its starting position for the next container. FIG. 9C illustrates container 54 being squared by its confinement in cage guides 71. Other well-known alternative methods for pulling container 54 out of magazine 42 also may be substituted.

Figure 10:
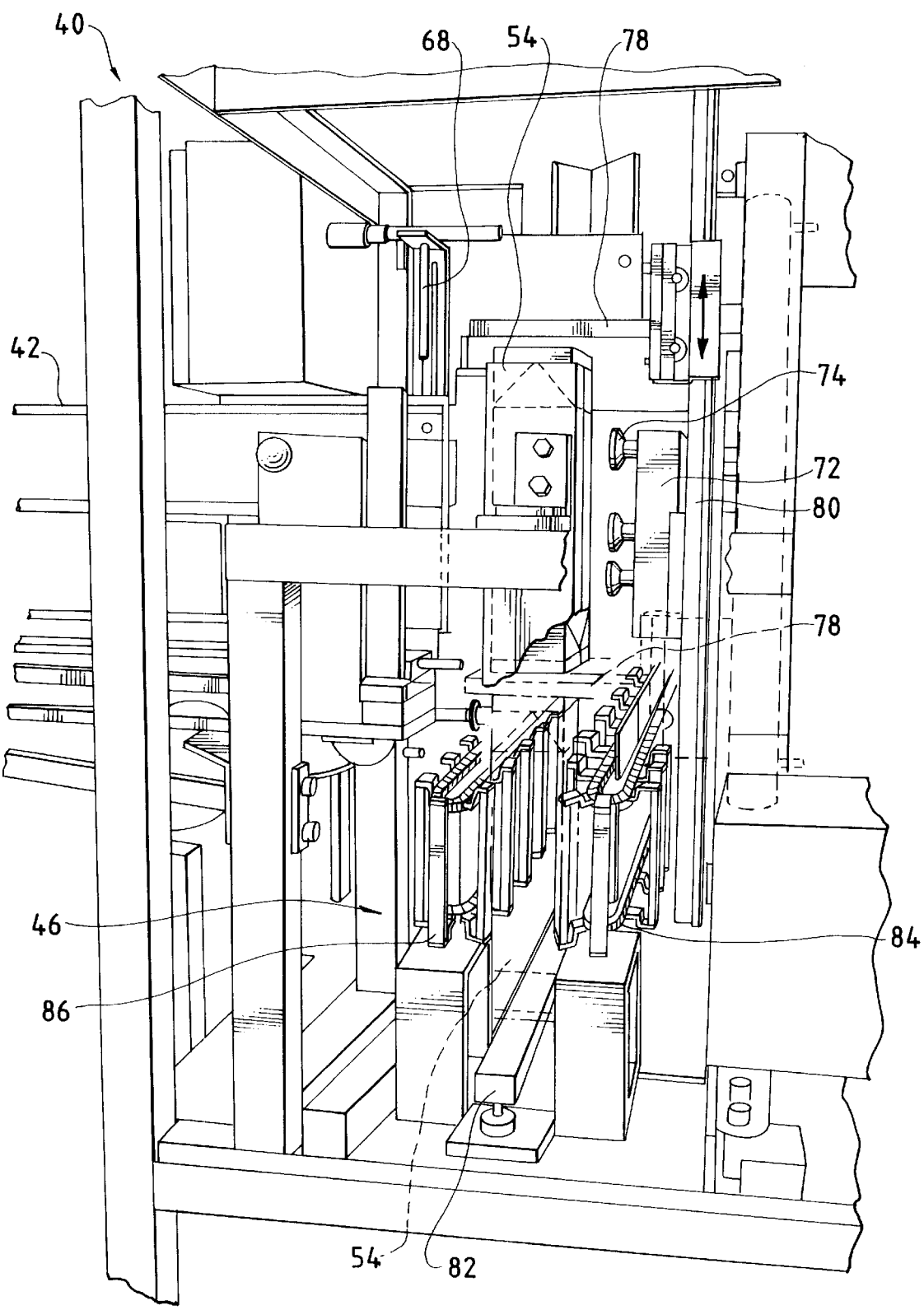
FIG. 10 is a perspectives view showing a squared carton prior to its being downloaded to a conveyor and, in phantom, showing the squared carton after it has been inserted into the conveyor by a loading arm in accordance with the present invention.

Referring now to FIG. 10, after withdrawal from magazine 42, container 54 is aligned directly below horizontal loading arm 78. Loading arm 78 is mounted on a vertical shaft 80 and is movable vertically along shaft 80 by any conventional drive mechanism. After container 54 is retained by cage guides 71 and released from vacuum head 72, loading arm 78 is driven downwardly along shaft 80 to engage the top end flaps of container 54. Loading arm 78 continues its downward direction and transports container 54 into conveyor 46 such that portions of the bottom end flaps of container 54 rest on a bottom rail 82. Cage guides 71 provide a track for the descent of container 54 into conveyor 46. Bottom rail 82 preferably is adjustable so that machine 40 can be readily modified to accept containers of varying heights. In addition, conveyor 46 can be modified to accept containers of varying width and depth. After pushing container 54 into conveyor 46, loading arm 78 returns to its original position for the next container 54.

In the preferred embodiment, conveyor 46 consists of two parallel drive chains 84 having opposed lugs 86 that define square (or rectangular, if appropriate) conveyor receptacles for receiving containers 54. Portions of the bottom edges of container 54 sit on bottom rail 82 as conveyor 46 transports the container towards applicator station 48. Bottom rail 82 can be adjusted to properly align the preformed hole of container 54 with the applicator station 48.

Figure 11:
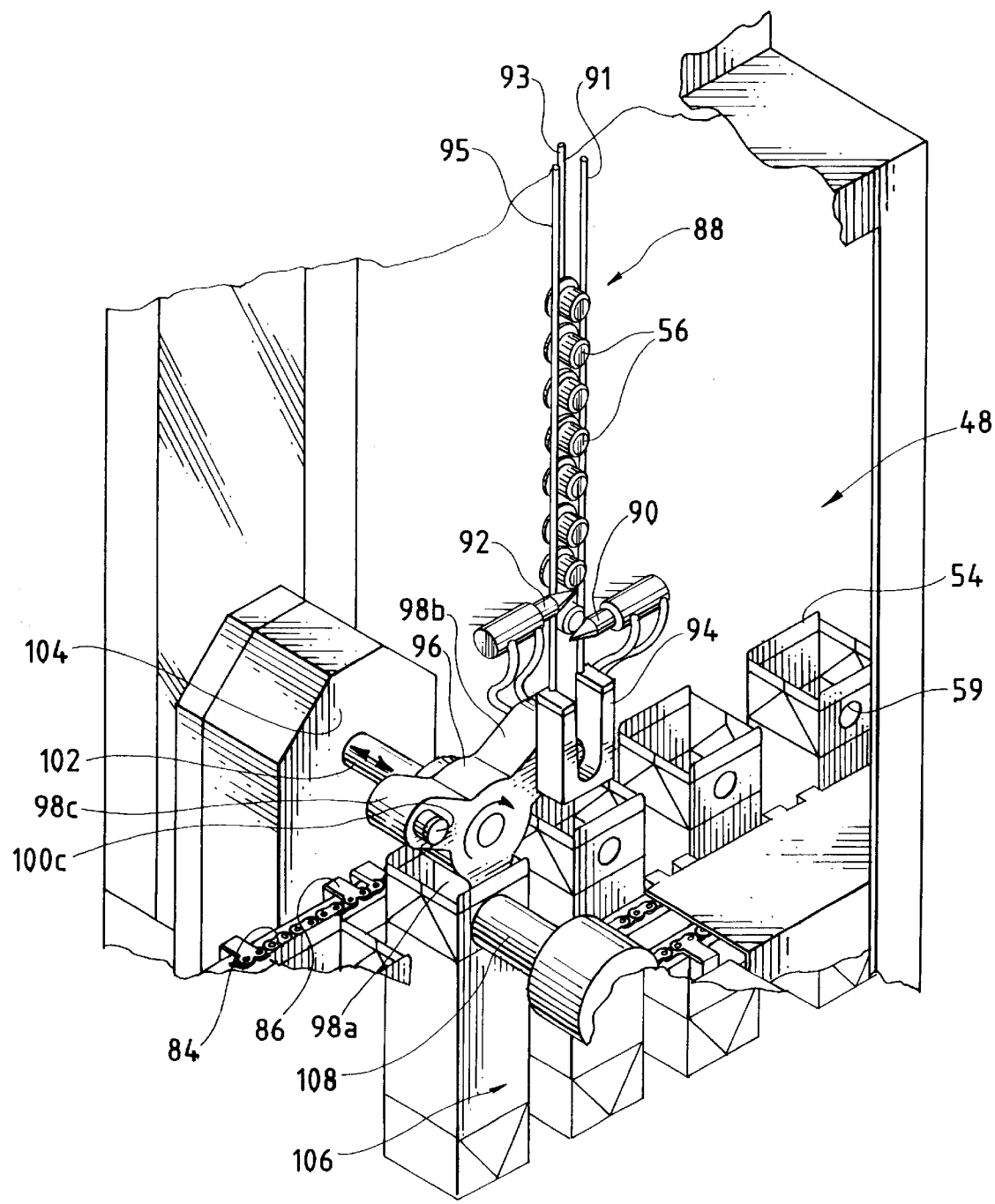
FIG. 11 is a perspective view showing a series of cartons as they approach an anvil for attaching the spouts in accordance with the present invention.
Figure 12:
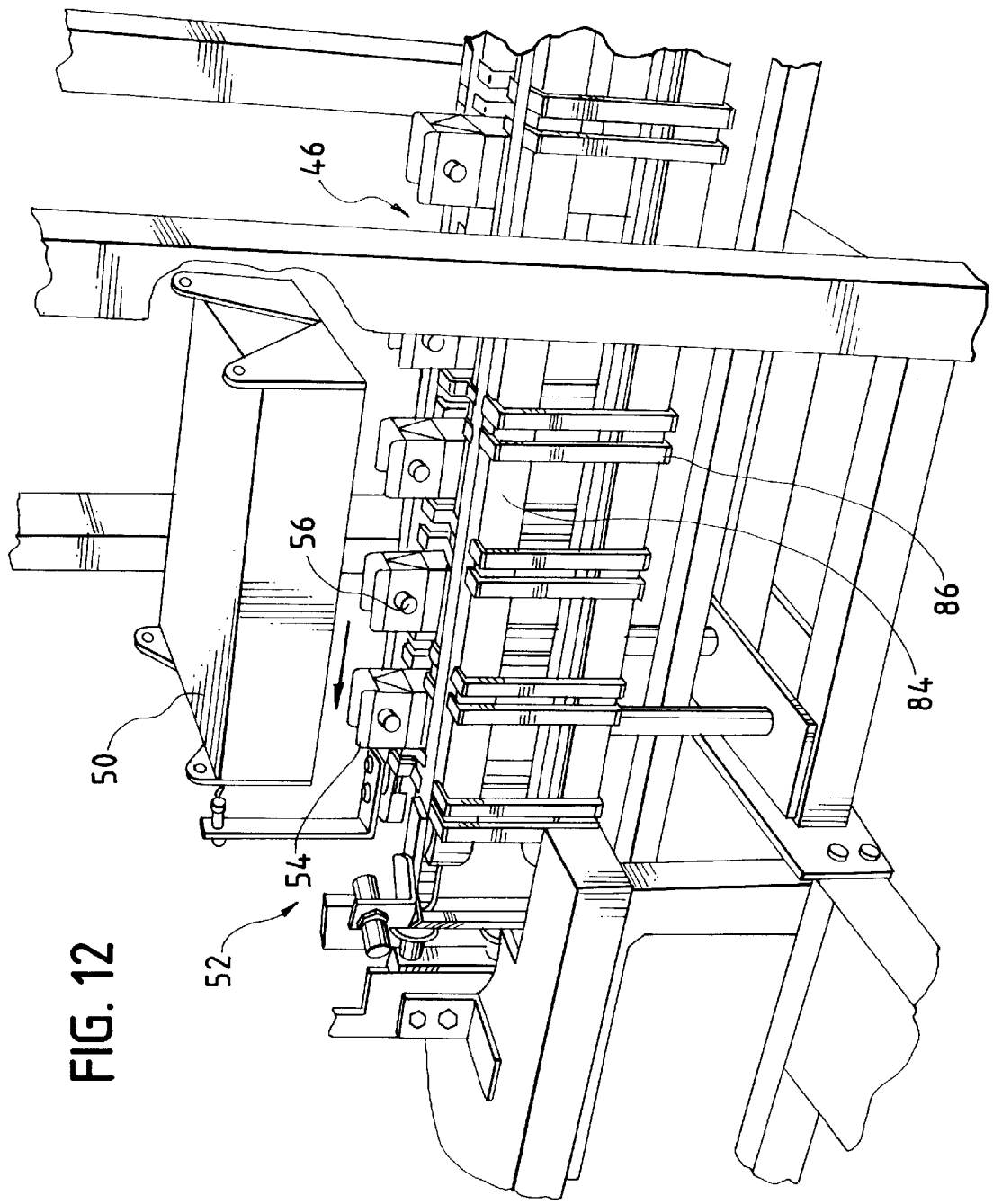
FIG. 12 is a perspective view showing the containers traveling beneath a UV sterilization unit in accordance with the present invention and then being discharged from a conveyor and introduced to a standard machine in accordance with the present invention.

Applicator station 48 is depicted in FIG. 11. Applicator station 48 includes a vertical spout accumulator 88 which receives spouts 56 fed from a conventional spout hopper 89, such as the rotary cap and parts feeder available from Hoppmann Engineering. Spout accumulator 88 includes three vertical metal bars 91, 93 and 95 which extend downward to an escapement 94. A lower finger 90 and an upper finger 92 are located adjacent the vertical metal bars and above escapement 94 for isolating a single spout 56. Fingers 90 and 92 alternate retracting in a manner described below. Escapement 94 receives an individual spout 56 when lower finger 90 retracts.

Applicator station 48 also includes an anvil 96. Anvil 96 preferably has three lobes 98a,b,c spaced 120° apart from one another. Each lobe 98a,b,c has mounted thereon a mandrel 100a,b,c dimensioned to fit snugly within the interior of spout 56. Only mandrel 100c is visible in FIG. 11. As indicated by the arrows in FIG. 11, anvil 96 is mounted for rotational and axial translational motion on a shaft 102. Shaft 102 is driven by a conventional drive source 104 capable of imparting rotational and axial translational motion to anvil 96.

Spaced across from anvil 96 is an ultrasonic welder 106. Ultrasonic welder 106 includes a horn 108. As shown in FIG. 11, horn 108 is positioned directly opposite the location of lobe 98a when lobe 98a is inserting spout 56 through hole 59 of container 54. Horn 108 is capable of movement toward and away from the position occupied lobe 98a in FIG. 11 in a direction perpendicular to the direction of travel of containers 54 in conveyor 46.

As containers 54 are sequentially transferred to spout applicator station 48, one of lobes 98a,b,c of anvil 96 rotates into the open top end of each container 54. In FIG. 11, lobe 98a has rotated into the open top end of a container 54. Simultaneously, lobe 98b is rotated into position directly behind escapement 94, which holds a single spout 56. When anvil 96 first rotates into container 54, lobe 98a is centrally located within the open top end of container 54. Similarly, lobe 98b is spaced behind escapement 94 in FIG. 11. Anvil 96 is then advanced such that spout 56 on lobe 98a passes through hole 59 and spout flange 58 contacts the inside wall of container 54. Simultaneously, mandrel 100b of lobe 98b is inserted into the interior of spout 56 located in escapement 94. At the same time this is occurring, horn 108 is moved into engagement with the area of container 54 adjacent hole 59. Ultrasonic welder 106 ultrasonically vibrates the periphery of hole 59, thereby heating the heat-sealable substrate adjacent spout flange 58 to weld spout flange 58 to the interior wall of container 54. Anvil 96 and horn 108 are then retracted. Lobe 98a is withdrawn from welded spout 56 which is now attached to container 54. Simultaneously, lobe 98b withdraws spout 56 from escapement 94. Conveyor 46 then transfers the next container 54 into position as lobe 98b is rotated into the open top end of that container 54. While anvil 96 is rotating, lower finger 90 is retracted to allow the next spout 56 to descend into escapement 94 for withdrawal by lobe 98c. After lower finger 90 is returned to its holding position, upper finger 92 is retracted to allow a spout 56 to descend between lower finger 90 and upper finger 92. Upper finger 92 then returns to its original holding position.

Although a specific system for attaching spout 56 to container 54 has been described herein, it should be understood that this specific system is not necessary to the invention. The invention contemplates the use of other suitable systems for attaching spout 56 or other fitments to the inside or outside wall of container 54. Such systems may include using radio frequency waves, heat or a suitable adhesive. In addition, the spout or fitment may be attached to the inside wall of a container by entering either the top or bottom opening of the container.

After the attachment of spout 56, container 54 continues on conveyor 46 towards UV disinfectant unit 50. In the preferred embodiment, UV disinfectant unit 50 is a model UV XSL 2000 available from Aquionics Incorporated of Erlanger, Ky. 41018. UV disinfectant unit 50 includes shutters that automatically close when conveyor 46 is turned off. When the shutters are open, UV light radiates down toward conveyor 46. UV unit 50 effectively disinfects the inner wall of container 54. The speed of conveyor 46 must be adequate to ensure sufficient exposure of container 54 to the UV light.

Figure 13:
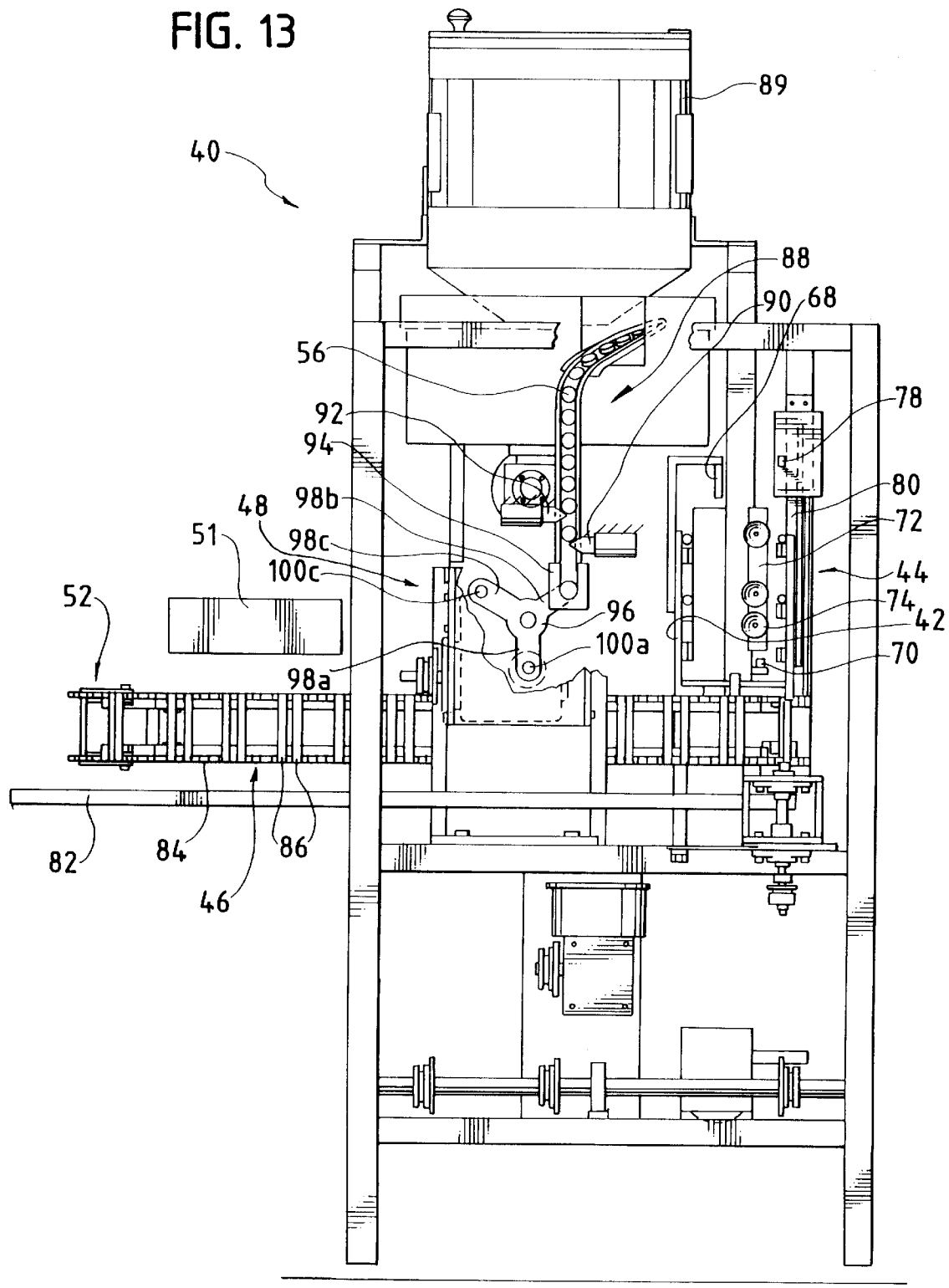
FIG. 13 is a front elevational view of an alternative embodiment of the invention using a chemical solution disinfecting unit.

Unlike the cleansing performed by existing systems, machine 40 advantageously disinfects vertically positioned container 54 while the top and bottom ends are open and before the bottom end is sealed. For example, in the embodiment in which machine 40 utilizes a UV unit 50, the entire inner wall of container 54 is exposed to the UV light, thereby destroying any contamination not only in the top flaps and interior side wall of container 54, but also on the bottom flaps of container 54. In existing systems, disinfection occurs after the bottom flaps have been folded and sealed. Thus, a UV unit 50 cannot penetrate the corners and folded edges of the container. Machine 40 reduces or eliminates the problem of contaminants surviving in the corners or folded edges of container 54. Moreover, on existing machines, if chemical or steam sterilization is used, contaminants or chemical residue can be trapped in the interior of the container. In the embodiments wherein machine 40 utilizes chemical cleansing (via a chemical solution disinfecting unit 51, as shown in FIG. 13) or steam cleansing (via a steam disinfecting unit 53, as shown in FIG. 14), contamination is reduced or eliminated because disinfection occurs while the bottom end of container 54 is open.

After passing beneath UV unit 50, containers 54 continue travelling on conveyor 46 toward an outfeed station 52. At outfeed station 52, container 54 has had a spout 56 attached to it, and the inside of the container 54, including any portion of spout 56 exposed to the inside of the container, has been disinfected. Unlike existing systems, the entire bottom end of container 54 also has been cleansed.

Container 54 is vertically fed from outfeed station 52 into a prior art machine such as machine 10 with only minimal modifications to machine 10. First, it is recommended that the prior art machine be sanitized or cleansed prior to the introduction of the disinfected containers. This might include installing or adapting clean air filters and spraying the machine with a disinfectant to make the prior art machine more sanitary. In addition, magazine 14 of machine 10 is removed because machine 10 no longer receives flat blank containers. Also, the apparatus in machine 10 used for initially opening containers is no longer needed. Containers 54 can be fed into machine 10, for example, by a vacuum head or other mechanical means that draws the container 54 from outfeed station 52 into squaring cage guides. Then the container is placed on a vertically hanging mandrel suspended from a horizontally rotating carousel wheel. Because a portion of spout 56 extends slightly into the interior of container 54, the mandrel will require certain relief on one of its sides in order to accommodate that portion of spout 56. Top sealing station 22 of machine 10 also is modified to take into account the presence of spout 56 on the outside wall of container 54. This modification entails providing relief in conventionally used sealing jaws.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. An apparatus for attaching a fitment to a partially formed container having a preformed hole and for disinfecting the partially formed container prior to introducing the partially formed container to a form, fill and seal machine, comprising:

means for maintaining an array of flat container blanks having preformed holes;

a first station for sequentially withdrawing a container blank from said maintaining means and opening its top and bottom ends;

conveyor means for receiving the container blank from said first station and sequentially moving the container blank through the apparatus and for introducing the container blank to the form, fill and seal machine;

means for transferring the open-ended container blank to said conveyor means;

attaching means adjacent said conveyor means for securing the fitment to the container blank so as to cover the preformed hole prior to the introduction of the container blank to the form, fill and seal machine and while the ends of the partially formed container are open; and means for disinfecting at least a portion of the inner wall of the open-ended container blank while the container blank is in a substantially vertical orientation and both ends of the container blank are open prior to the introduction of the container to the form, fill and seal machine for bottom forming and sealing, filling and top forming and sealing.

2. A method of attaching a fitment to a partially formed container having a hole, comprising:

supplying a flat container blank having a hole adapted to receive a fitment;

partially forming the container by forming the container blank into a cylinder with both ends open;

attaching a fitment in the hole;

orienting the partially formed container in a substantially vertical orientation after the fitment is attached and with the bottom end open, whereby any debris therein can fall out the bottom end of the partially formed container;

disinfecting the partially formed container after the fitment is attached and while both the top and bottom ends are open; and discharging the partially formed container with the fitment attached for further processing comprising bottom and sealing, filling and top forming and sealing.

3. The method as claimed in claim 2 wherein the further processing is performed by a form, fill and seal machine wherein the bottom of the partially formed container is closed, product is introduced into the container and the top of the container is closed.

4. An apparatus for attaching a fitment to a partially formed container having a hole, comprising:

a source of container blanks having holes;

a first station for sequentially withdrawing a container blank from said source and partially forming a container having its top and bottom ends open;

a conveyor for receiving the partially formed container from said first station and sequentially moving the partially formed container through the apparatus;

an attaching station for receiving the partially formed container from said conveyor for securing the fitment to the partially formed container so as to cover the hole;

a disinfecting unit for disinfecting at least a portion of the interior of the partially formed container while the partially formed container so as to cover the hole;

wherein the partially formed container is output from the apparatus with the fitment attached thereto, with the partially formed container ends open and in a substantially vertical orientation such that any debris can fall out of the bottom end of the partially formed container.

5. The apparatus as claimed in claim 4 wherein said conveyor is adapted to discharge the partially formed container to a form, fill and seal machine after a fitment is secured to the partially formed container at said attaching station and wherein the partially formed container is discharged to a form, fill and seal machine for bottom forming and sealing, filling and top forming and sealing.

* * * * *

UNITED STATES PATENT AND TRADEMARK OFFICE
CERTIFICATE OF CORRECTION

PATENT NO.    : 6,066,081
DATED         : May 23, 2000
INVENTOR(S)   : Jerry G. Bachner It is certified that error appears in the above-identified patent and that said Letters Patent is hereby corrected as shown below:

Column 1,
Line 34, delete "machines" and insert -- machine --;

Column 10,
Line 37, delete "so as to cover the hole;" and insert -- ends are open; and --.

Signed and Sealed this

Thirty-first Day of July, 2001

Attest:

NICHOLAS P. GODICI
Attesting Officer
*Acting Director of the United States Patent and Trademark Office*